United States Patent

Davis

[15] 3,648,847
[45] Mar. 14, 1972

[54] FILTER AID CONDITIONERS

[72] Inventor: Bernard J. Davis, Biloxi, Miss.

[73] Assignee: Reichhold Chemicals, Inc., White Plains, N.Y.

[22] Filed: June 9, 1970

[21] Appl. No.: 57,016

Related U.S. Application Data

[62] Division of Ser. No. 789,592, Jan. 7, 1969, Pat. No. 3,570,669.

[52] U.S. Cl. ............................................210/500, 252/357
[51] Int. Cl. ..............................................................B01d 39/00
[58] Field of Search ...........................210/75, 193, 500, 502; 252/357

[56] References Cited

UNITED STATES PATENTS

| | | |
|---|---|---|
| 2,636,038 | 4/1953 | Brandner ..........................252/357 X |
| 3,242,073 | 3/1966 | Guebert et al. .......................210/75 X |
| 3,352,424 | 11/1967 | Guebert et al. .......................210/75 X |
| 3,368,678 | 2/1968 | Gilbert .....................................210/75 |
| 3,570,669 | 3/1971 | Davis .......................................210/75 |

*Primary Examiner*—Reuben Friedman
*Assistant Examiner*—R. W. Burks
*Attorney*—Munson H. Lane and Munson H. Lane, Jr.

[57] ABSTRACT

This application discloses a composition comprising a mixture of an oxazoline with a filter aid and to its use in filtering apparatus. This composition facilitates the removal of suspended solids from polymers and its solutions in nonpolar solvents. The preferred oxazolines are 4,4-dihydroxy methyl or 4-monohydroxymethyl-2-alkyloxazoline, wherein the alkyl group can range from $C_6$ to $C_{22}$ in length, but is preferably in the range of $C_{12}$ to $C_{16}$.

4 Claims, No Drawings

FILTER AID CONDITIONERS

This is a division of application Ser. No. 789,592, filed Jan. 7, 1969, now U.S. Pat. No. 3,570,669.

The invention relates to a composition and method for improving the properties of filter aids in nonaqueous systems so that these modified filter aids can easily form strong, free flowing filtration beds to remove suspended solids from polymers or essentially nonaqueous polymer solutions in relatively nonpolar solvents, lubricants, vegetable oils and similar systems wherein difficulty is met in properly wetting, and depositing a free and rapid filtration bed composed of a good precoat on the filters of the filtration system for removal of solids from polymer solutions or oils.

More specifically the invention relates to a composition comprising a mixture of an oxazoline with a filter aid and to its use in filtering apparatus. This composition facilitates the removal of suspended solids from polymers and its solutions in non-polar solvents. The preferred oxazolines are 4,4-dihydroxymethyl or 4-monohydroxymethyl-2-alkyloxazoline, wherein the alkyl group can range from $C_6$ to $C_{12}$ in length, but is preferably in the range of $C_{12}$ to $C_{16}$.

In the removal of solids from polymer solutions, various filtration means are used in well established unit operations for the separation of solutes from their solids. In some applications, the filter zone is prepared by the build-up of a precoat material on the filter cloth. Uniform thickness and holding power by the filter cloth of the precoat is quite important for good filtration. The preliminary, but fundamentally necessary step of preparing a satisfactory precoat is also subject to many complications.

One particularly troublesome difficulty exists because of the unavoidable moisture content in the filter aid hydrocarbon slurry. There is a tendency for the filter aid slurry, either while being employed to precoat, or during the filtration operation, itself, to agglomerate on the filter cloth in the primary filter zone. This agglomeration results in an uneven precoat which markedly increases the susceptibility of the precoat to breakthrough by the suspended solids of the solute, due to inadequate coating on areas of the filter cloth.

There is also a marked tendency for the precoat to fall off the filter cloth by slumping when any significant variations in the filter throughput rate are experienced. This precoat failure destroys the filtration function completely and the filters must undergo the expensive, time consuming procedure of building up a new precoat, during which time the filtration unit cannot perform its removal function.

In the previous art it was found that some satisfactory results could be obtained by carefully controlling the water content of the filter aid-hydrocarbon slurry which goes to form the precoat. The filter aid, usually a commercially available mineral, such as diatomaceous earth, synthetic silicas, asbestos fibers, and cellulose fibers, are available as supplied with a water content ranging between 200-300 parts per million. It is impractical to further calcine these materials or fibers, as supplied, to reduce the water content to what has been accepted as acceptable levels.

Furthermore, the diatomaceous earth comprises only a few weight percent of the hydrocarbon solvent when converted to slurry for deposition on the filters. The prior art carefully controlled the water content to narrow limits by predrying streams so that the final water content in the system being filtered was no more than 30-50 parts per million.

Therefore it becomes an object of this invention to provide an improvement of filter aids in nonaqueous systems.

Another object is to provide modifiers for filter aids with marked surface activity in nonaqueous systems.

A further object is to provide modifiers for filter aid which actively trap water in nonaqueous filtration systems.

Still another object of this invention is to provide modifiers for filter aids that have a suspending effect on filter aids in nonaqueous systems to prevent packing and agglomeration.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In accordance with this invention it has been found that certain materials having marked surface activity occlude the hydrogen bonding sites on the filter aid, actively trap water present in the system in this occluded layer, leaving a lyophilic layer exposed on the surface of each filter aid particle so that no adverse forces are exerted to reduce the rate of filtration over the cohesive strength of the precoat to itself or to the filter cloth. The resultant system is essentially insensitive to water being present at levels as high as 500 parts per million and actually serves to remove this water as an entrapped water in oil layer during filtration. Furthermore, it has been found that these modifiers also exert a suspending effect on the filter aid to prevent packing and agglomeration yet allow the filter aid to form a fixed cohesive, free flowing bed. It has been discovered that the most effective filter aid treating agents are members of a family of substituted oxazolines having the following configuration

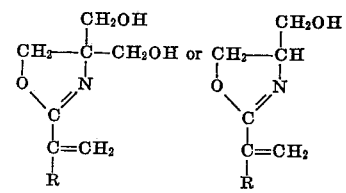

wherein R is a straight chain paraffin or olefin with a $C_8$ to $C_{22}$ chain length. The $C_{12}$–$C_{16}$ chains were most effective. Oxazolines with no hydroxylmethyl groups were uneffective. The dihydroxylmethyl oxazoline configuration gave better results in the presence of higher water levels than the monohydroxymethyl derivatives, which in turn were found to be more effective than oxazolines containing no hydroxymethyl groups.

Examples where the above described filter aid conditioner is applicable include olefinic polymers, such as polymers from isoprene, piperylene and the like, or mixed olefins with appended aromatic groups such as styrene, methylstyrene and the like. They also include terpene resins as derived, e.g., from dipentene, phellandrene, camphene and the like. They include further aliphatic and aromatic hydrocarbon polymers such as mineral oils, coumaron-indene resin, polymeric oils such as vegetable oils, lubricants and the like.

Evaluation tests were run in plant conditions where above specified compounds were filtered in the absence of a solvent and also dissolved in a non-polar solvent. The technique involved is typified by the following example:

EXAMPLE A

Piperylene was polymerized at 40 percent solids in xylol using 2 percent anhydrous aluminum chloride as a catalyst. Polymerization was run at 20° C. When polymerization was completed 5 percent hydrated lime was added for neutralization of the catalyst, and the system heated to 100° C. At this point the system was filtered through a Sparker filter press wherein the precoat was prepared with xylol and diatomaceous earth containing a small percentage of asbestos fiber. The efficiency of filtration was measured by the number of gallons of filtrate processed before the bed had to be changed. The filter aid modifiers were added to the prepared filter aid slurry before making the precoat bed on the filter by simply stirring it into the solvent-filter aid system. The amount of modifier can vary between about 0.025 and about 1.0 percent by weight on the weight of the filter aid with little effect on its efficiency.

Over 1.0 percent was deemed wasteful.

Initial laboratory tests demonstrated that the dihydroxymethyl oxazoline derivative was most effective in systems containing up to 500 parts per million water and that of this type of oxazoline those having hydrophobe chains of $C_{12}$ to $C_{16}$ were most effective. The oxazoline derivative employed in examples I—VI had the following structure.

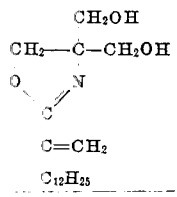

Such compounds are manufactured by Reichhold Chemicals, Inc., White Plains, N.Y., under the name Deltazoline, with the above particular type called Deltazoline A-14.

EXAMPLES I–VI

Runs were made employing the piperylene resin solution described above.

TABLE I

| % Deltazoline A-14 in filter aid | Filtration Capacity of 558 ft.² of filter area |
|---|---|
| none | Precoat not acceptable for filtration due to agglomeration |
| 1.0 | 35,000 gallons/cycle |
| 0.5 | 34,000 gallons/cycle |
| 0.1 | 15,000 gallons/cycle |
| 0.05 | 13,000 gallons/cycle |
| 0.025 | 32,000 gallons/cycle |
| 0.01 | 10,000 gallons/cycle |

It can be seen above that the marked efficiency of the oxazoline derivative is evidenced in concentration of 0.025% by weight op the filter aid or over.

What is claimed is:

1. A composition for facilitating the removal of solids from a polymer by filtration comprising a mixture of at least one oxazoline selected from the group having the formulas

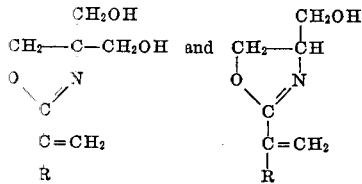

wherein R is selected from a group consisting of paraffins and olefins having 8 through 22 carbon atoms, with a filter aid.

2. A composition according to claim 1, wherein the amount of oxazoline ranges from about 0.25 to about 1 percent by weight based on the filter aid used.

3. A composition according to claim 1, wherein the oxazoline is selected from a group consisting of 4,4-dihydroxymethyl and 4-monohydroxymethyl-2-alkyloxazoline, wherein the alkyl group can range from $C_6$ to $C_{22}$ in length.

4. A composition according to claim 3 wherein the alkyl group has a range of $C_{12}$ to $C_{16}$ in length.

* * * * *